Nov. 8, 1966 L. MASLOW 3,283,915

TRAY OR RACK ASSEMBLY

Filed March 31, 1964 8 Sheets-Sheet 1

INVENTOR.
LOUIS MASLOW
BY Friedman & Goodman
ATTORNEYS

Nov. 8, 1966 L. MASLOW 3,283,915
TRAY OR RACK ASSEMBLY
Filed March 31, 1964 8 Sheets-Sheet 3

INVENTOR.
LOUIS MASLOW
BY
Friedman & Goodman
ATTORNEYS

Nov. 8, 1966  L. MASLOW  3,283,915
TRAY OR RACK ASSEMBLY
Filed March 31, 1964  8 Sheets-Sheet 4

INVENTOR.
LOUIS MASLOW
BY
Friedman & Goodman
ATTORNEYS

Nov. 8, 1966 L. MASLOW 3,283,915
TRAY OR RACK ASSEMBLY
Filed March 31, 1964 8 Sheets-Sheet 5

INVENTOR.
LOUIS MASLOW
BY
Friedman & Goodman
ATTORNEYS

Nov. 8, 1966  L. MASLOW  3,283,915
TRAY OR RACK ASSEMBLY
Filed March 31, 1964  8 Sheets-Sheet 6

INVENTOR.
LOUIS MASLOW
BY
Friedman & Goodman
ATTORNEYS

Nov. 8, 1966  L. MASLOW  3,283,915
TRAY OR RACK ASSEMBLY
Filed March 31, 1964  8 Sheets-Sheet 7

INVENTOR.
LOUIS MASLOW
BY
Friedman & Goodman
ATTORNEYS

INVENTOR.
LOUIS MASLOW
BY
Friedman & Goodman
ATTORNEYS

United States Patent Office 3,283,915
Patented Nov. 8, 1966

3,283,915
TRAY OR RACK ASSEMBLY
Louis Maslow, Huntsville Road, Dallas, Pa.
Filed Mar. 31, 1964, Ser. No. 356,200
31 Claims. (Cl. 211—126)

This application is a continuation-in-part of Patent No. 284,045 filed May 29, 1963, now Patent No. 3,217,890 issued November 16, 1965.

The present invention relates to trays or racks for various articles.

It is an object of the present invention to provide an arrangement whereby a multiplicity of different types of racks or trays may be assembled as desired, from a minimum number of basic elements.

It is another object of the present invention to provide a system for fabricating racks or trays of various different types which include a common base element to which there may be added one or more auxiliary elements to provide a rack or tray of the desired type.

In accordance with the foregoing objects, it is another object of the present invention to provide such a rack fabricating system in which the characteristics of the rack can be specifically tailored to the dimensions of the articles which are to be stored therein.

It is another object of the present invention to provide such a rack forming system wherein in addition to providing means for forming racks of different heights or depths, depending upon the types of articles to be stored therein, the racks may be provided with various different dividers which are related to the articles to be stored therein.

It is another object of the present invention to provide racks of the described type which are relatively light in weight and which have a relatively long and useful life.

It is a further object of the present invention to provide racks of the described type which have various sections or parts which can be formed relatively inexpensively, as by a molding operation, and which are simple to assemble and which therefore can be manufactured and sold at relatively low prices.

Other and further objects and advantages of the present invention will be readily apparent to those skilled in the art from a consideration of the following specifications taken in connecton with the appended drawings.

In the drawings, which illustrate the best modes presently contemplated for carrying out the invention:

Figure 1:
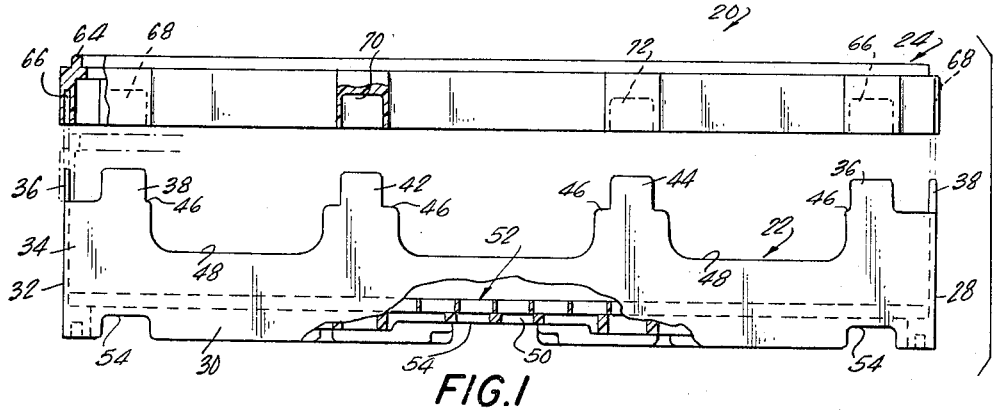
FIGURE 1 is an exploded elevation view of a two part rack pursuant to the present invention, portions being broken away for purposes of illustration.
Figure 2:
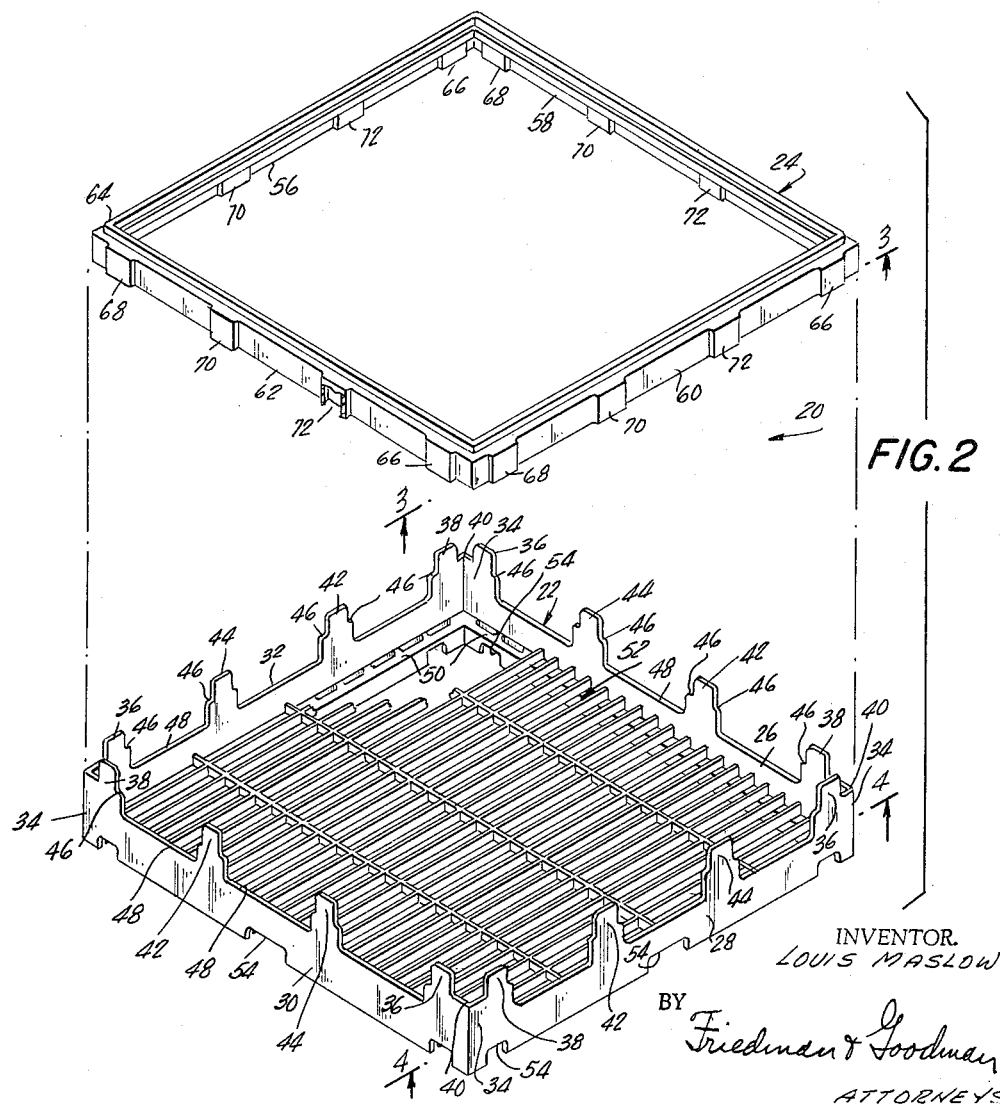
FIGURE 2 is a perspective exploded view of the rack illustrated in FIGURE 1 with portions being broken away for purposes of illustration.
Figure 3:
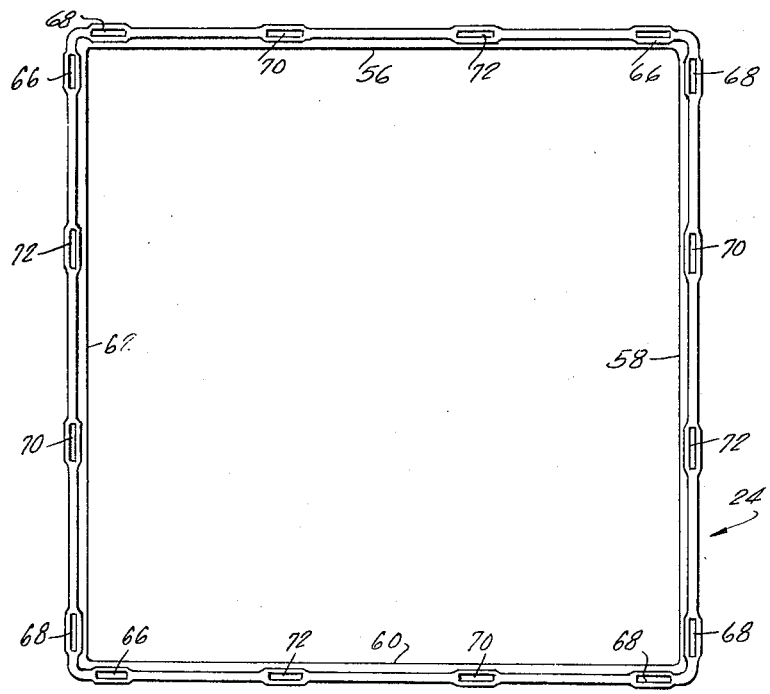
FIGURE 3 is a bottom plan view of the rim member of the rack assembly illustrated in FIGURES 1 and 2.
Figure 4:
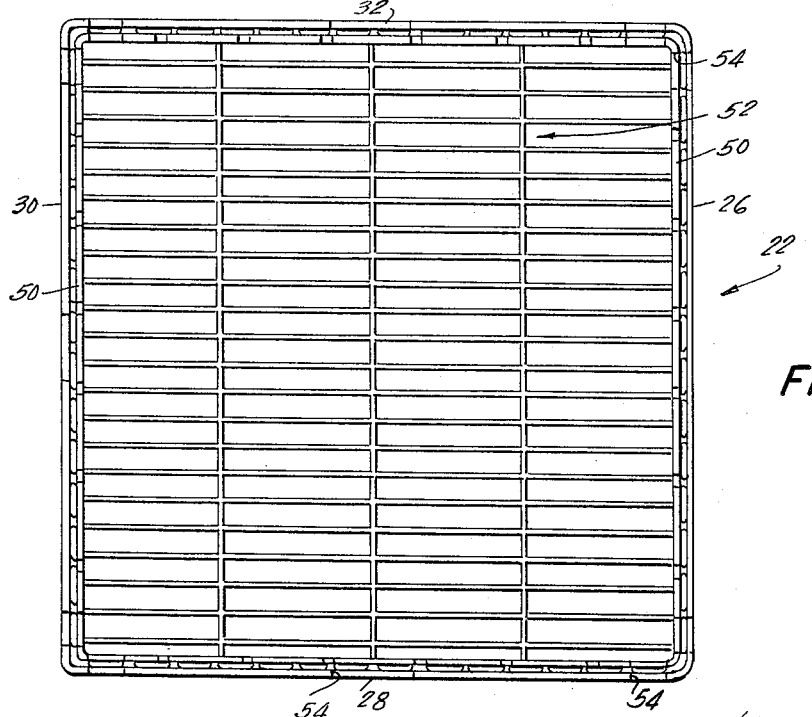
FIGURE 4 is a bottom plan view taken of the base member of the rack assembly illustrated in FIGURE 2.

Referring now to FIGURES 1 through 4 of the drawings in detail, there is illustrated a tray or rack assembly 20 pursuant to the present invention. As here shown, the tray assembly 20 comprises a base member 22 and an open frame rim member 24. Each of the members 22 and 24 is formed of a suitable plastic, preferably being fabricated by a molding operation.

The base member 22 is a unitary element of substantially rectangular conformation. As here shown, the base member is provided with four side walls 26, 28, 30 and 32 which define a square. At each of the four corners defined by the four side walls, provision is made for a corner conformation 34. Each corner conformation 34 comprises a pair of right-angularly related fingers or projections 36 and 38 between which there extends a corner ledge 40. Between each pair of adjacent corner ledges 40, each of the side walls of the base member 22 is provided with a pair of equally spaced fingers or projections 42 and 44. It will be noted that each of the fingers 42 and 44 is provided with a pair of shoulders 46. Similarly, it will be noted that each of the corner fingers 36 and 38, is provided also with a shoulder 46 at the edge thereof opposite the ledge 40. The fingers 42 and 44 are separated from each other and from the adjacent corner fingers by recessed marginal edges 48. At the inner surface thereof, each of the side walls 26, 28, 30 and 32 is provided adjacent its lower edge with a bottom openwork ledge 50. The ledges 50 mount an open gridwork 52. The four side walls 26, 28, 30 and 32 are provided also with bottom edge recesses or cutouts 54 which serve to reduce the weight thereof.

The previously mentioned rim member 24 forms the upper member or element for the tray or rack assembly 20. As here shown, the rim member 24 is also a rectangular or square element having the four side walls 56, 58, 60 and 62. A continuous rim 64 is provided along the upper marginal edges of the side walls of the rim member. At best shown in FIGURE 3, at each corner of the rim member 24, there is provided a pair of recess of pockets 66 and 68 which are open at the lower surface of the rim member. It will be understood that the paired pockets 66 and 68 are adapted to receive the paired corner fingers 36 and 38 respectively, of the base member 22. Intermediate the corner recesses, each wall of the rim member 24 is provided with a pair of equally spaced recesses or pockets 70 and 72 which are open at the lower surface of the rim member 24. It will be understood that the intermediate fingers 44 of the base member 22 are adapted to be received in the associated recesses 72 of the rim member and that the intermediate fingers 42 of the base member are adapted to be received in the associated recesses 70 of the rim member. Consequently, it will be readily apparent that when the rim member 24 overlies the base member 22, as illustrated in each of the FIGURES 1 and 2, the tray assembly 20 may be readily assembled by bringing the overlying members together so that the various fingers which project upwardly from the base member 22 are received in the overlying associated recesses or pockets. When the tray assembly 20 is so assembled, it will be apparent that the lower marginal edge of each corner of the rim assembly will be seated on and abut the underlying associated corner ledge 40 of the base member. Moreover, each recessed marginal edge 48 of the base member will be spaced below the overlying lower marginal edge of the associated side wall of the rim member, so as to define therewith an enclosed opening in the side wall of the tray assembly 20, to facilitate washing and drying operations, as well as to reduce weight.

Figure 11:
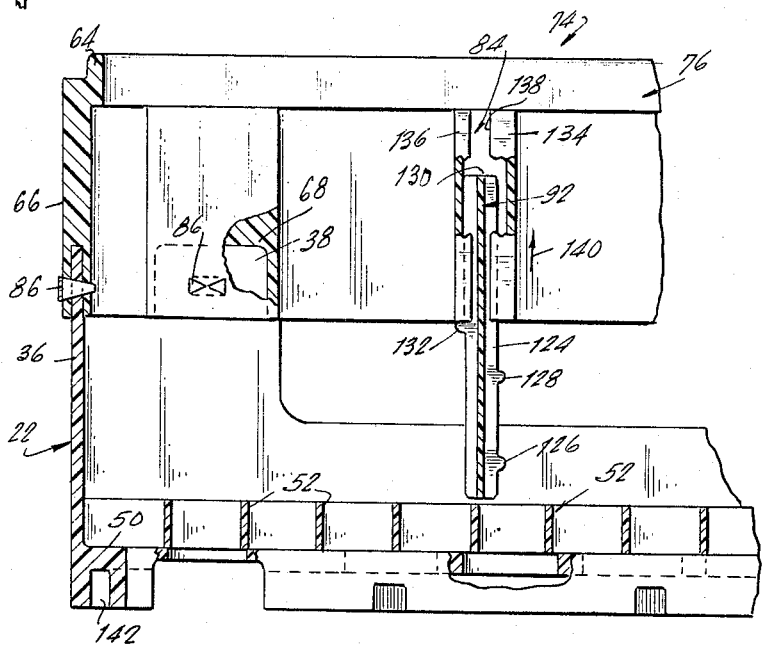
FIGURE 11 is a fragmentary sectional view taken on the line 11—11 of FIGURE 10.

In view of the foregoing, it will be apparent that the tray assembly 20, which is constituted by the assembled base member 22 and rim member 24, can be readily mounted in assembled relation by merely bringing said members together, as shown in broken lines in FIGURE 1, by inserting the upstanding fingers or projections of the base member into the overlying recesses or pockets of the rim member which are open along the lower marginal edge thereof. The tray assembly can be retained in assembled relation preferably by inserting clips 86, as shown in FIGURE 11, through the pockets of the rim member so as to engage the projecting fingers previously inserted therein. In this manner the clips will extend through each finger as it passes through the pocket. Open grid 52, which is surrounded by the four side walls of the rim member and the superimposed four side walls of the rim member provides a relatively large flat expanse of area on which there may be mounted various articles, as may be desired. For example and not by way of limitation, dishes or cutlery may be mounted on the open grid 42 for storage or for drying or to be subjected to the action of the water in a dishwashing machine, as the tray assembly 20 passes through the machine.

Figure 9A:
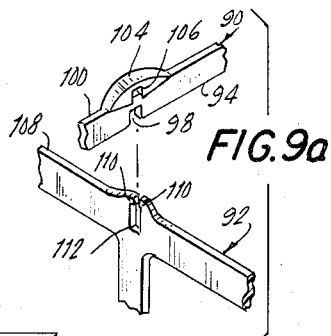
FIGURE 9a is a fragmentary view illustrating the assembly of the elements which form the divider or cellular assembly of the rack assembly illustrated in FIGURE 5.
Figure 8:
FIGURE 8 is an end view taken on the line 8—8 of FIGURE 7.
Figure 9:
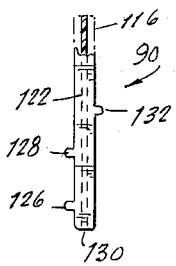
FIGURE 9 is a fragmentary sectional view taken on the line 9—9 of FIGURE 6.
Figure 9:
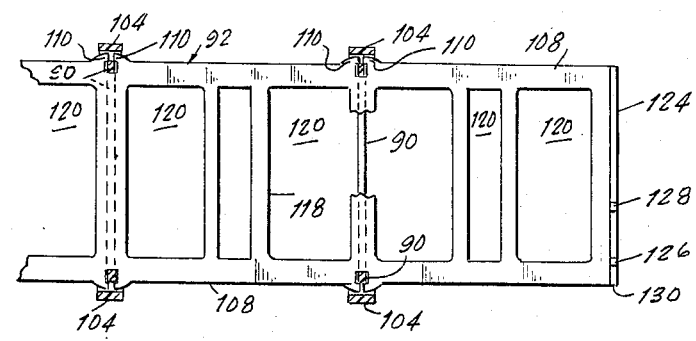
Figure 10:
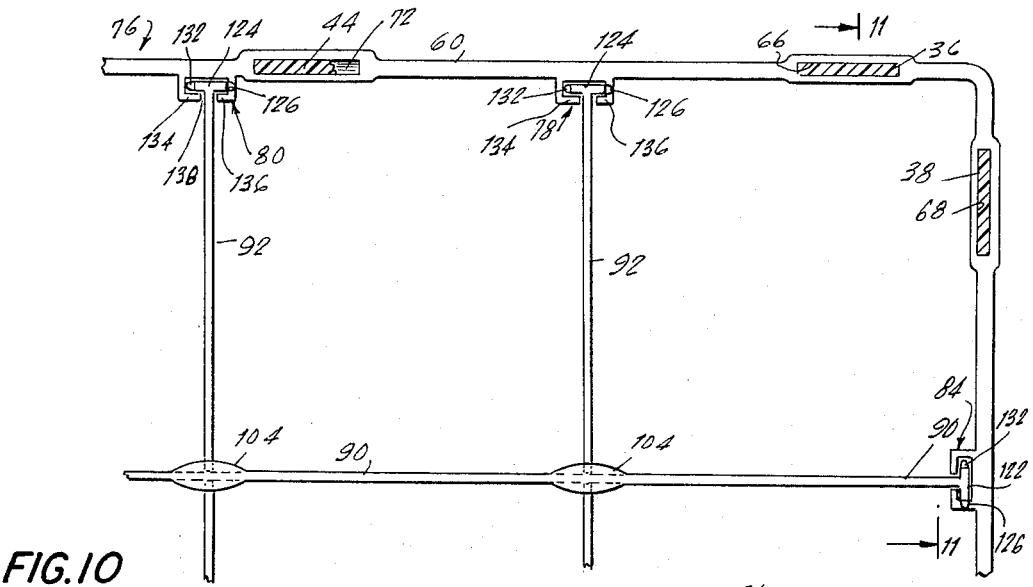
FIGURE 10 is a fragmentary sectional view, on an enlarged scale, taken on the line 10—10 of FIGURE 5.

Referring now to FIGURES 5 through 11 of the drawings in detail, there is illustrated another embodiment of the present invention. Pursuant to the embodiment of the invention shown in these figures, there is provided a tray or rack assembly 74 which has provision to subdivide its article storage area. As here shown, the rack assembly 74 is provided with the previously described base member 22. However, in lieu of the rim member 24, the rack assembly 74 is provided with a rim member 76. The rim member 76 is essentially the same as the rim member 24 and similar reference numerals indicate similar parts. However, the rim member 76 differs from the rim member 24 in that povision is made at the inner surface of each of the side walls of the rim member 76 for four open channel confirmations which are identified by the reference numerals 78, 80, 82 and 84. In addition, each of the walls of the rim member 26 is preferably taller or higher than the corresponding side wall of the rim member 24. It will be noted, as best shown in FIGURE 10, that the open channels 78, 80, 82 and 84 are of eccentric construction for a purpose which is hereinafter desribed in detail.

Figure 5:
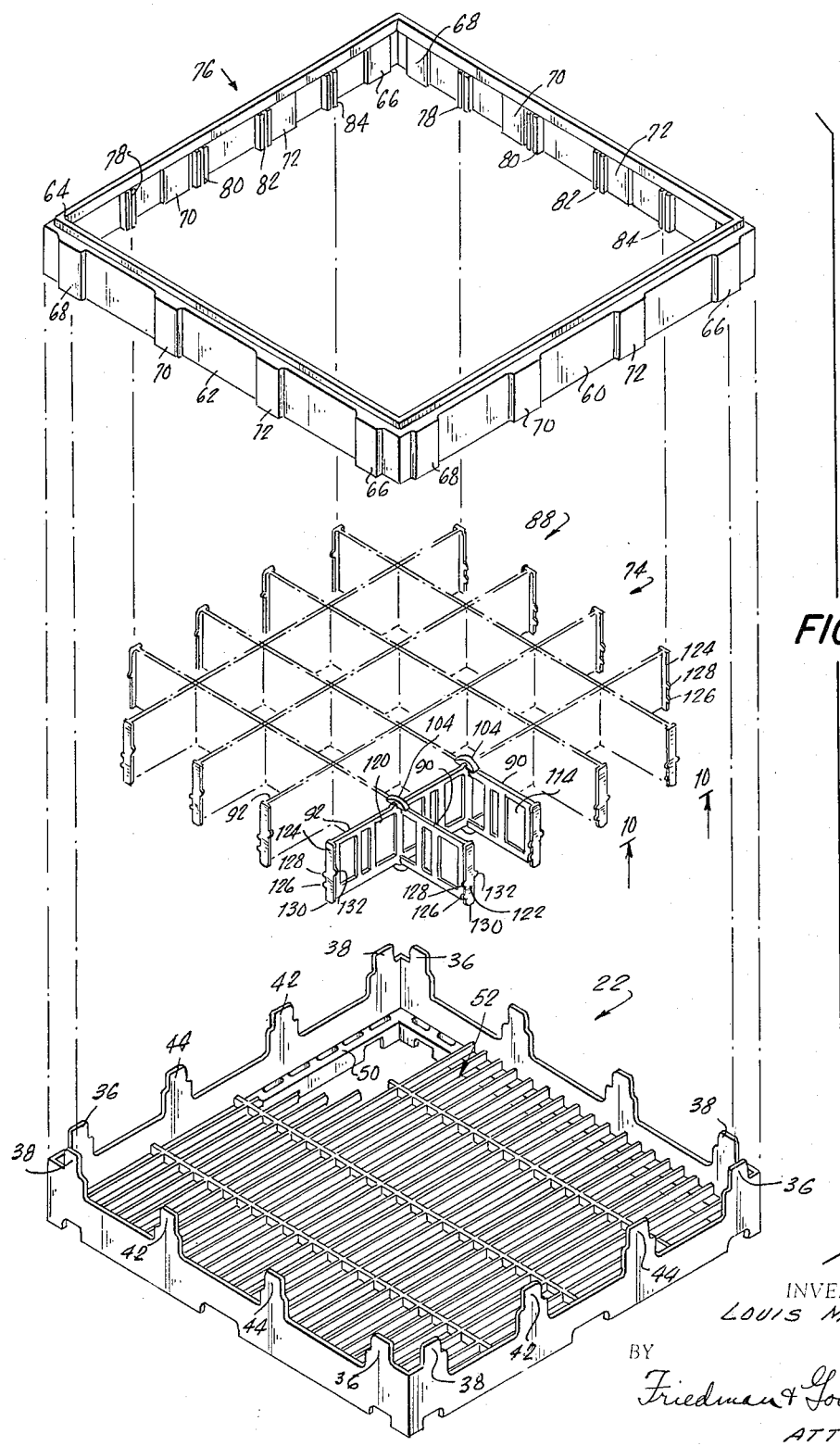
FIGURE 5 is an exploded view of a two part rack assembly provided with a divider pursuant to the present invention.
Figure 6:
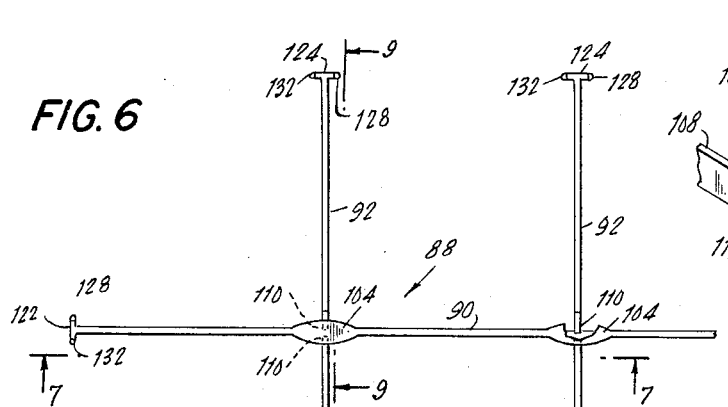
FIGURE 6 is a fragmentary view on an enlarged scale of the divider or cellular assembly utilized in the rack assembly illustrated in FIGURE 5.
Figure 7:
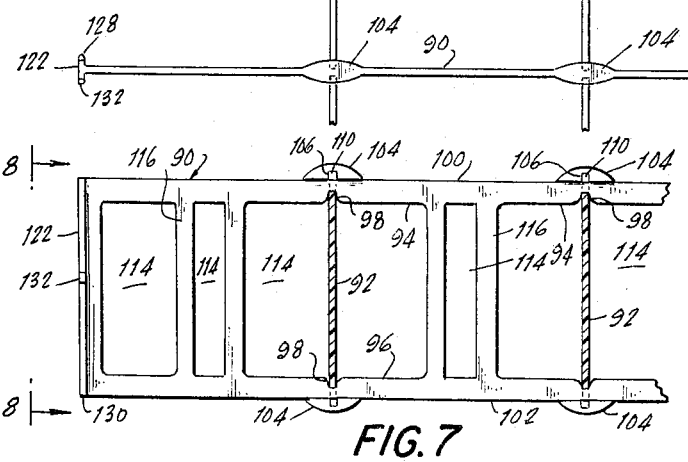
FIGURE 7 is a fragmentary sectional view taken on the line 7—7 of FIGURE 6.

In addition to the base member 22 and the rim member 76, the rack assembly 74 is provided also with a cellular or divider assembly 88. The divider assembly 88 constitutes intersecting partitions which form separate sections in which articles may be retained in position on the open grid 52. Said cellular divider assembly is mounted within the rack assembly 74 by the open channels provided on the inner surface of the rim member 76. The cellular assembly 88 is formed by a first series of openwork strips 90, as best shown in FIGURE 7, which are mounted in intersecting relation with a second series of openwork strips 92, which are best shown in FIGURE 9. As best shown in FIGURES 5, 6 and 10, all of the strips 90 are mounted in parallel so as to intersect with all of the strips 92, which are mounted in parallel relation and at right angles to the strips 90. In order to permit for the interengagement of the strips 90 and 92, respectively, the strips 90 are provided along inner marginal edges 94 and 96 thereof with open recesses or notches 98. The associated outer marginal edges 100 and 102 respectively are provided above each notch 98 with a raised arcuate portion 104, having opposing indentations 106. The strips 92 are each provided along their opposing outer edges 108 with arcuate confronting ears 110—110 between which there is defined an open inwardly extending recess 112. In order to effect the assembly of the strips 90 and 92 so as to form the callular assembly 88, the outer edge notched strips 92 must be threaded through the openings 114 defined in the inner edge notched strips 90 which openings are provided with the inner edge notches 98. When so threaded, as shown in FIGURES 5, 6 and 7, interengagement of the strips may be effected by interengaging the notches 98 and 112, and interengaging the ears 110 in the indentations 106 of the associated arcuate portions 104 of the strips 90, as best shown in FIGURES 6 and 9. It will be noted that the openings 114 in the strips 90 are defined by integral ribs 116 which serve to strengthen the openwork strips. The strips 92 are also provided with strengthening ribs 118 and openings 120 of various sizes which openings, as in the case of strips 90, serve to decrease the weight of the strips and which ribs serve to increase the strength thereof. Each strip 90 terminates at each end thereof with an integral transverse guide retainer portion 122. Similarly, each strip 92 terminates with a transverse T-shaped guide retainer portion 124 at each end thereof. The guide retainer portions 122 and 124 are exactly similar. It will be noted, as shown in FIGURE 8, that each guide retainer portion 122 and 124 is provided at one marginal side edge thereof with a pair of laterally projecting fingers 126 and 128, the fingers 126 being adjacent end 130 of the guide retainer portion and the finger 128 being spaced above the finger 126. In addition, each such guide retainer 122 or 124, as the case may be, is provided with a third laterally projecting finger 132 which extends in a direction opposite the direction of extent the fingers 126 and 128 and which is spaced upwardly from the finger 128 at the opposite longitudinal marginal edge of the guide retainer portion. As best seen in FIGURE 5, for each strip 90 or 92, as the case may be, the fingers from the guide retainer at one end of the strip extends in an opposite direction from the fingers at the other end of the strip. For example, viewing FIGURE 5 and with respect to the lowermost strip 92, it will be noted that at the lefthand end guide retainer 124, the single finger 132 projects to the right and the twin fingers 126 and 128 project to the left. Viewing the other, or the righthand end of said strip 92, it will be noted that the twin fingers 126 and 128 project to the right and therefore it will be apparent that the single finger 132 projects to the left. An inspection of the strips 90 in said figure will reveal the same relationship of the projecting fingers at the opposite ends of each strip 90.

In order to assemble the rack assembly 74, the divider or sectional assembly 88 is first constructed by weaving the strips 92 through the strips 90 so as to interengage all of the recessed portions 112 of the strips 92 with the associated notched portions 98 of the strips 90 to provide the sectional assembly 88. The sectional assembly is then engaged with the rim member 76 by utilizing the open channels 78, 80, 82 and 84 of the rim assembly to mount the sectional assembly.

As previously indicated, the open channels 78, 80, 82 and 84 are eccentric. As best illustrated in FIGURES 10 and 11, each channel has a pair of wings 134 and 136. The wings define a longitudinal opening 138 therebetween for entrance into the associated channel. It will be noted that the wing 134 is larger than the associated wing 136, so that the channel opening 138 is off-centered to provide the previously referred to eccentric characteristic for each channel. When the guide retainers 122 and 124 of the associated strips are urged into the associated channels, upwardly from the bottom of the channels as indicated by the arrow 140 in FIGURE 11, due to the eccentric characteristic of the channels, the single projecting finger 132 will abut the bottom edge of one of the channel wings, namely, the wing 136, as best illustrated in said FIGURE 11.

With the cellular or divider assembly 88 assembled and engaged in the rim member 76 so that the various guide retainer ends 122 and 124 of the strips 90 and 92, respectively, are engaged in the associated open channels 78, 80, 82 and 84 of the rim member 76, the latter is then assembled with the base member 22. This is accomplished in substantially the same manner in which the base member 22 of the tray assembly was associated or assembled with the associated rim assembly 24 to form the tray assembly 20. In each case, as previously described, the projecting fingers 36, 44, 42 and 38 are engaged in the associated pockets 66, 72, 70 and 68. In both cases, the shoulders 46 of the associated projections or fingers of the base member 22 form abutments which are engaged by the overlying portions of the rim member along the lower edge of the rim member at the adjacent pockets of the latter and, as previously described, the corner ledges 40 of the base member are also engaged by the overlying corner portions of the rim member. Also, in each case, with the projecting fingers inserted into the overlying pockets, the base member is retained in assembled relation with the overlying rim member by the utilization of the previously described preferably metallic clips 86 which interengage the rim member and the fingers of the base member, as best illustrated in FIGURE 11, said clips being preferably provided at the various corners of the assembled structure and, if desired, also along the side walls of the assembled structure. With the rack assembly 74 in the assembled condition thereof illustrated in FIGURE 11, it will be readily apparent that any upward movement of the cellular divider assembly 88 in the direction of the arrow 140 is a preventive by the engagement of the lateral fingers 132 of the cellular assembly with the overlying wings 136 of the associated open channel formations. Furthermore, it will also be readily apparent that the cellular assembly 88 will overlie the open grid 52 of the base member 22 with relatively minimal clearance therebetween so that downward movement of the cellular assembly is prevented by the underlying open grid 52.

The rack assembly 74 being provided with the cellular assembly 88 is well adapted to mount suitably sized articles, such as glasses, or other objects within the various open sections of the cellular assembly. Such articles may be provided in the cellular assembly either for storage purposes or may be provided therein for washing purposes by inserting a loaded rack assembly into a conventional washing machine in which the articles thereof may be cleaned and dried and thereafter stored in the very same rack assembly. It will also be noted that the rack assembly 74 and the tray assembly 20 are each adapted for stacking thereof, one on top of the other.

For this purpose, and as previously indicated, the rim members 24 and 76 are each provided with the upstanding rim 64 along the upper marginal edge thereof. Also, the bottom ledge 50 of the base member defines an open channel 142, as best seen in FIGURE 11, along the bottom surface base member 22. Each upstanding rim 64 of the upper rim member is adapted to be received or inserted within the open bottom channel 142 of an overlying base member 22. In this manner, by inserting the rim member 64 of a tray assembly 20 or rack assembly 74 into the open channel 142 of an overlying rack assembly or tray assembly, a plurality of tray assemblies may be stacked in overlying disposition or a plurality of rack assemblies may be stacked in overlying disposition or tray assemblies may be vertically stacked with rack assemblies in any desired arrangement.

Figure 12:
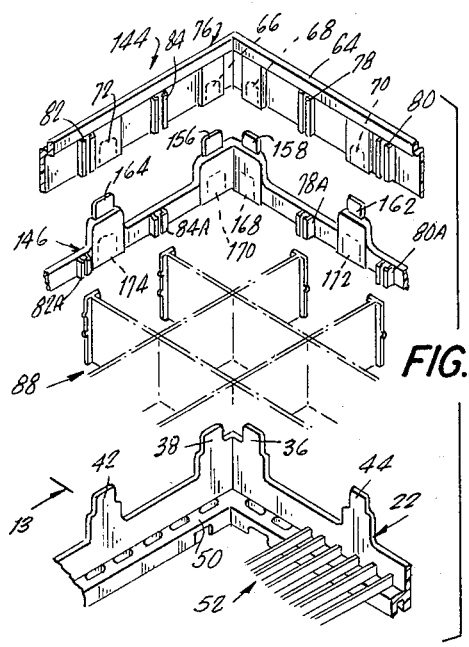
FIGURE 12 is a fragmentary, exploded view of a modified form of rack assembly pursuant to the present invention.
Figure 13:
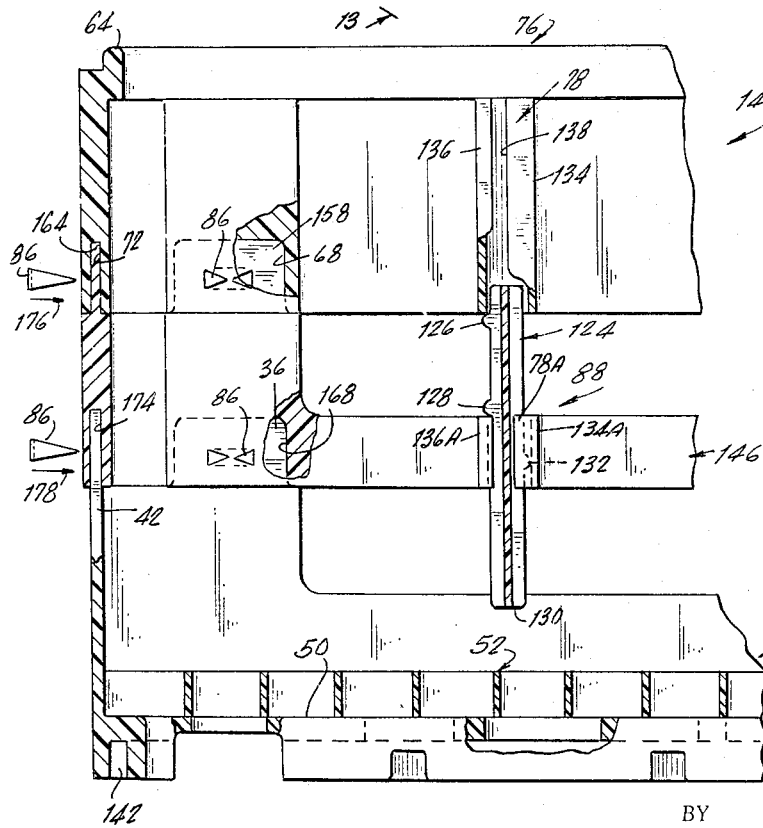
FIGURE 13 is a fragmentary sectional view on an enlarged scale taken on the line 13—13 of FIGURE 12, the rack assembly being illustrated in assembled condition.
Figure 15:
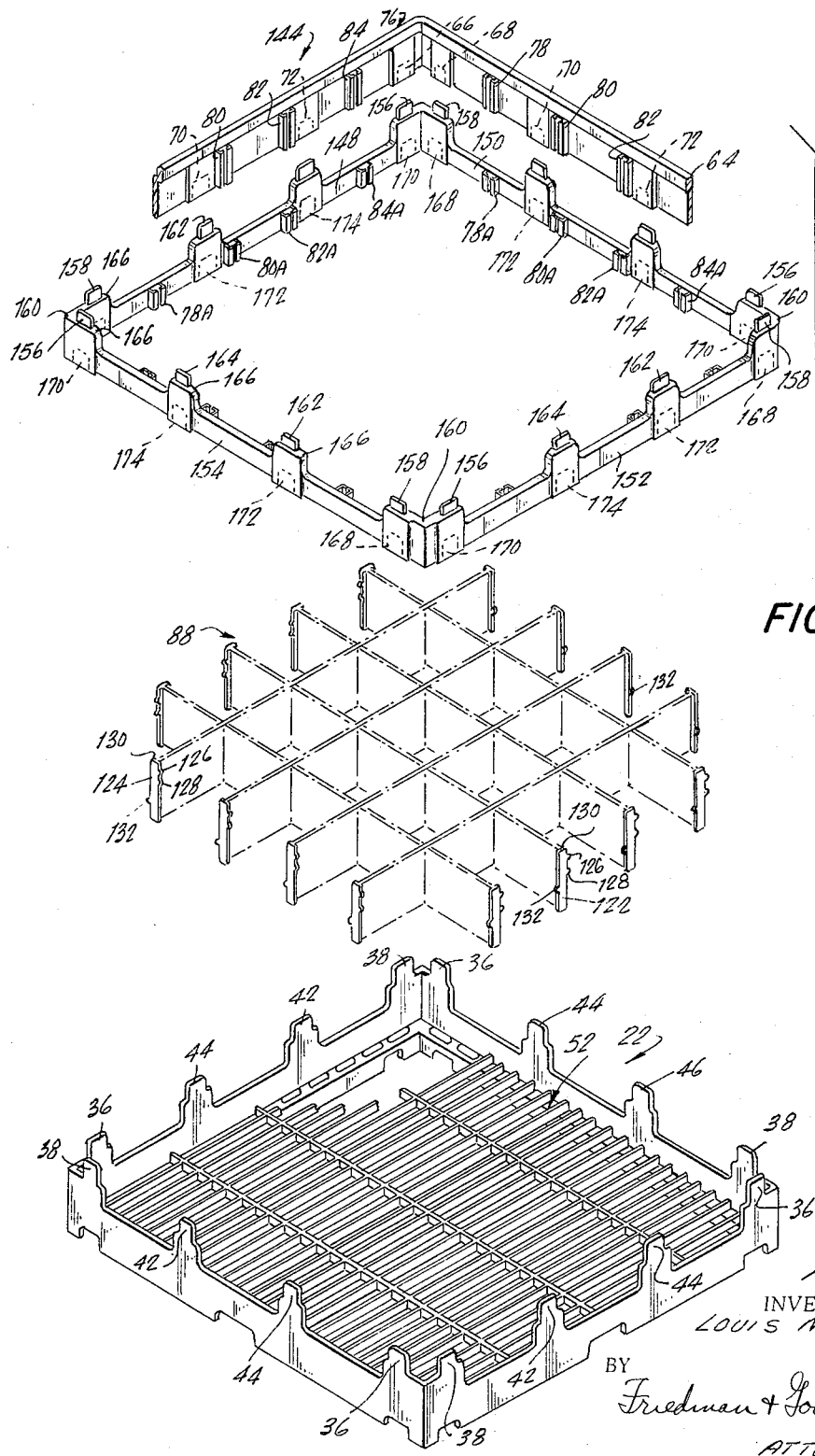
FIGURE 15 is an exploded perspective view of the rack assembly illustrated in FIGURE 12.

Referring now to FIGURES 12 and 13 in detail, there is shown a rack assembly 144. As here shown, the rack assembly 144 comprises the previously described base member 22, the previously described cellular or sectional assembly 88, the previously described rim member 76 and a spacer member 146. The spacer member 146, as shown both in FIGURES 12 and 15, is a generally rectangular open frame member having the four side walls 148, 150, 152 and 154. At the four corners of the spacer member 146, provisions is made for the paired fingers or projections 156 and 158. A raised corner ledge 160 extends between the companion fingers of each pair. Each wall is additionally provided with the pair of laterally spaced raised fingers or projections 162 and 164 between each corner of the spacer member 146. It will be noted that the raised fingers or projections of the rim member 146 are generally similar to the raised fingers or projections of the base member 22 and serve the same function. In this connection, it will be noted that the various fingers inwardly of the corner fingers are also provided with shoulders or detents 166 which are at the same level as the corner ledges 160 of the corner fingers, in the same manner that the shoulders or detents 46 of the base member 22 are at the same height or level as the corner ledges 40 thereof. At each corner thereof, the rim member 146 is provided along the bottom peripheral edge thereof with a pair of recesses or pockets 168 and 170. In addition, along each wall thereof, below the intermediate fingers or projections 162 and 164 thereof, the rim member 146 is provided with recesses or pockets 172 and 174. It will be understood that the various open recesses or pockets in the spacer member 146 are similar to the previously described recesses or pockets in the rim member 24 and, as in the latter, the recesses of the spacer member 46 are open at the lower surface thereof. It will also be noted that each wall of the spacer 146 is provided at its inner surface with the open channels or guides 78A, 80A, 82A and 84A, which are similar to the previously described guides 78, 80, 82 and 84 of the rim member 76.

In order to assemble the base member 22, the cellular assembly 88, the spacer member 146, and the rim member 76, to form the rack assembly 144, as shown in FIGURE 13, the rim member 76 is first assembled with the spacer member 146. This is accomplished by inserting the various projecting fingers 156, 158, 162 and 164 into the overlying open recesses or pockets 66, 68, 70 and 72, respectively. With the spacer 146 so assembled to the rim member 144, the members may be maintained in assembled relation by inserting the preferably metallic staples 86 through the walls of the associated recesses so as to engage the associated fingers therein, by forcing said staples or securing elements into the assembled members 176. It will be noted that when the rim member and spacer member are so assembled, the various open channels or guideways 78, 80, 82 and 84 on the inner surfaces of each wall of the rim member are aligned with the associated guideways 78A, 80A 82A and 84A respectively, on the four walls of the spacer member 146. As previously indicated, the vertical guideways or channels of the rim member are eccentric and it will be understood that a similar eccentricity is provided in the associated guideways of the spacer member 146, as best shown in FIGURE 13. In this connection, it will be understood that the open channels or guideways of the spacer member are each provided with a narrower channel wing 136A and a wider channel wing 134A, which corresponds to the narrow channel wing 136 and the wider channel wing 134 of the associated open channel of the upper rim member. Further, it will be noted by a comparison of FIGURES 5 and 15 that the cellular assembly 88 illustrated in FIGURE 15 is reversed or inverted by 180 degrees from the position of the cellular assembly 88 shown in FIGURE 5. This will be readily apparent from a comparison of the guide fingers 126, 128 and 132 as shown in FIGURE 5 and as shown in FIGURE 15, the same comparison being readily visible from a comparison of FIGURES 10 and 13. More specially, it will be apparent that the position of the guide retainer 124 shown in FIGURE 13 is inverted by 180 degrees from the position thereof as shown in FIGURE 10, and it will be understood that the same inversion is effected with respect to the associated guide retainers 122. Furthermore, it will be understood that the cellular assembly 88 is first associated with or mounted on the spacer member 146, as shown in FIGURE 13, before the spacer member 146 is assembled with the upper rim member 76 and stapled thereto. More specifically, in assembling the cellular assembly 88 with the spacer member 146, the entire cellular assembly is inverted or rotated by 180 degrees from the position thereof, as shown in FIGURE 5, to the position threeof as shown in FIGURES 12 and 15. In this connection, it will be noted that due to the eccentricity of the open channels in the spacer member 146, the guide retainer on the strips 90 and 92 can be inserted into the open channel in the manner shown in FIGURE 13. More specifically, there is enough clearance in the wider wing 134A to insert the single finger 132 into the wider wing, so that the finger 128 will abut the upper end of the narrow wing 136A. With the various end retainers so disposed in the associated open guide channels, it will be apparent that the cellular assembly 88 is fixed in position on the spacer member 146 and cannot fall below the latter in view of the fact that the single finger 128 engages the upper end of the associated narrow wing 136A. Moreover, when the spacer member 146 is assembled with the upper rim member 76 as previously described, it will be noted that the upper end of each guide retainer on each strip 90 and 92 extends into the lower end of the overlying or aligned open guide channel of the upper rim member. Again due to the eccentricity of the upper guide channel, the retainer cannot pass beyond the point where the finger 126 engages the lower end of the narrow wing 136A of the associated channel. Consequently, it will be apparent that when associated with the spacer member in the manner illustrated in FIGURE 13, the cellular assembly is securely locked in position between the rim member and the spacer member. It will be noted that in order to so assembly the spacer member with the rim member, the various fingers projecting upwardly from the spacer member are inserted into the overlying open pockets or recesses of the rim member, as shown for example in connection with the finger 164 of the spacer member and the associated recess 72 of the upper rim member, as illustrated in FIGURE 13.

With the sub-assembly comprising the rim member, the spacer member and the cellular assembly secured therebetween, the rack assembly 144 is finally assembled by assembling the base member 22 therewith. This is readily accomplished by inserting the various projecting fingers of the base assembly into the overlying open recesses or pockets of the spacer member, as shown for example in FIGURE 13 wherein the finger 42 of the base member is inserted into the open recess or pocket 174 of the spacer member. It will be understood that the assembly of the base member with the spacer member is essentially the same as the previously described assembly of the base member 22 and upper rim member 24, as shown in connection with FIGURES 1 and 2. The base member is then secured to the spacer member by inserting the clips 86 in the direction of the arrows 178 through the walls of the various pockets so as to engage with the fingers disposed therein.

It will be readily apparent that the rack assemblies 144 may be stacked one on top of the other in the same manner as previously described in connection with the rack assemblies 74, it being noted that this results from the fact that raised rim 64 on each upper rim member 76 may be readily inserted into the bottom surface open channel 142 of the overlying base member 22 associated with the overlying rack assembly.

Figure 14:
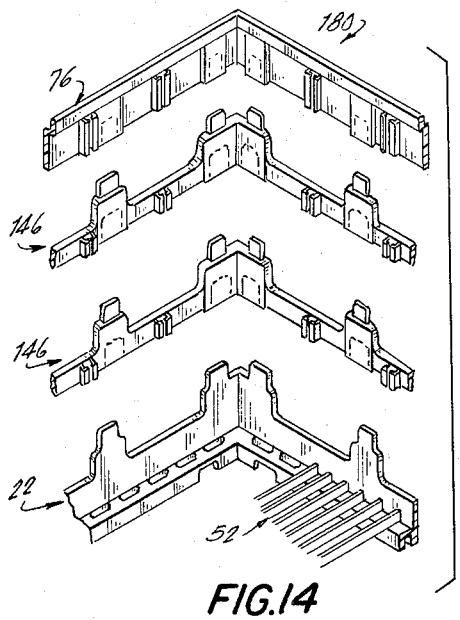
FIGURE 14 is a view similar to FIGURE 12 and illustrates another form of rack assembly pursuant to the present invention.

In order to accommodate articles which would require a higher or taller rack assembly, so as not to project above the rim 64 of the upper rim member 76, provision may be made for the rack assembly 180 illustrated in FIGURE 14. The rack assembly 180 differs from the rack assembly 144 only in the provision of an additional spacer 146. In other words, the rack assembly 180 is provided with two spacers 146 in lieu of the single spacer 146 in the rack assembly 144. Consequently, in the completed rack assembly 180, it will be apparent that the projecting fingers of the base member 22 extend into the overlying open pockets or recesses of the lower spacer member 146 and that the projecting fingers of said lower spacer member extend upwardly into the overlying pockets or recesses of the upper spacer member 146. The projecting fingers of the upper spacer member 146 extend into the overlying pockets or recesses of the upper rim member 76 in the same manner as described in connection with the rack assembly 144. In this connection, it will be further understood that the cellular member 88 may be positioned between the upper rim member 76 and the upper spacer member 146 in the same manner as illustrated in FIGURE 13, and that the portion of the cellular assembly which extends below the upper spacer member 146 will have the guide retainers 122 and 124 thereof extending into the underlying vertically aligned open guide channels of the second or lower spacer member 146, as will be readily apparent. Further, in this connection, it will be understood that various changes and modifications may be made in this respect in connection with either the rack assembly shown in FIGURE 12 or the rack assembly shown in FIGURE 14. In this connection, it will be readily apparent that additional spacer members 146 may be added or eliminated, as desired and that narrower or wider upper rim members 76 may be utilized to provide any overall height that may be desired for the final rack assembly.

Figure 16:
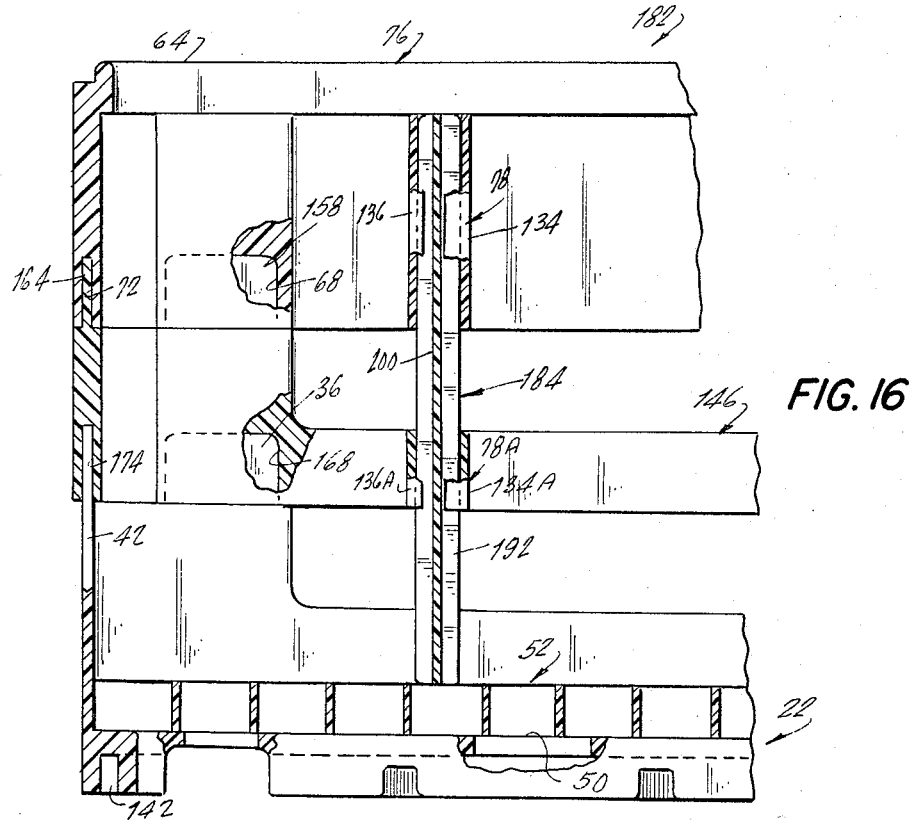
FIGURE 16 is a modified form of the rack assembly illustrated in FIGURE 13.
Figure 17:
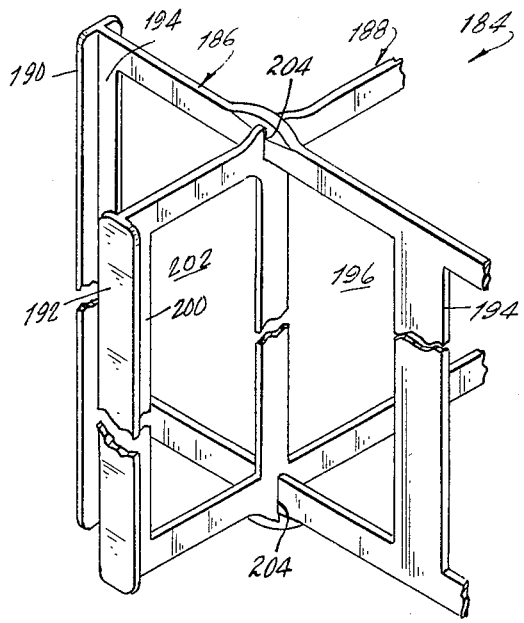
FIGURE 17 is a fragmentary perspective view of the cellular or divider assembly utilized in the rack assembly illustrated in FIGURE 16.

Referring now to FIGURES 16 and 17 in detail, there is shown another embodiment of the present invention constituted by a rack assembly 182. The rack assembly 182 is essentially the same or similar to the rack assembly 144, but differs therefrom in the provision of a cellular assembly 184 which extends substantially all the way from the upper rim member to the base member and is not spaced from the upper rim 64 of the upper rim member nor from the grid. The cellular assembly 184 is comprised of the interengaged strips 186 and 188. The strips 186 and 188 are substantially taller or higher than the previously mentioned strips 90 and 92 and differ therefrom essentially in that the associated T-shaped end retainers 190 and 192 of said strips are not provided with the offset fingers 126, 128 and 132. More specifically, it will be noted that the end retainers 190 and 192 are symmetrical and furthermore that the longitudinal edges thereof are free of any fingers or projections of any kind. The strips 186 are provided with vertical ribs 194 which define openings 196 therein. It will be understood that the strips 188 are provided with vertical ribs 200 which define openings 202. The strips 188 are provided at each opening 202 with a pair of outwardly opening notches 204. In assembling the strips 186 and 188 to form the cellular assembly 184, the strips 188 are threaded through the openings 196 provided in the strips 186 so that the outer notches 204 of strip 188 engage with the strips 186, as best shown in FIGURE 17. It will be noted also that the strips 186 and 188 are interlocked also in the same manner as the strips 90 and 92, as illustrated in FIGURE 9a, the strip 186 having the raised arcuate portions 104 above notches 98 and opposing indentations 196, strips 88 being provided with arcuate confronting ears 110 and recesses 112, as previously described. It will be understood that the notches and ears are assembled in the same manner as previously described in connection with FIGURE 9a. It will be readily apparent that when the strips are so interengaged, they define essentially rectangular sections or cells substantially in the same manner as previously described in connection with the strips 90 and 92. Since the end retainers of the cellular assembly 184 are symmetrical and do not contain the previous projections 126, 128 and 132, they are readily insertable into the vertically aligned open channels of the upper rim member 176 and the spacer member 146, as best shown in FIGURE 16.

In order to assemble the rack assembly 182, the upper rim member 76 may first be assembled with spacer member 146 in the same manner as previously described in connection with FIGURES 12 and 13. The cellular assembly 184 may then be readily assembled with the assembled rim member 76 and spacer member 146 from below the latter by merely urging cellular assembly upwardly in position in the assembled rim member and spacer member by inserting the end retainers 190 and 192 into the aligned open channels in the spacer member and upper rim member. When the cellular assembly 184 has been assembled in this manner with the rim member and spacer member, the completed sub-assembly may then be readily assembled with the base member 22. All that needs be done, is to assemble the fingers of the base member into the overlying recesses or pockets of the spacer member as previously described in detail. When this has been accomplished, it will be noted that the bottom of the cellular assembly will be resting on the gridwork 52 of the base assembly and the upper end of the cellular assembly will abut the upper marginal edge portion 64 of the rim member 76 as illustrated in FIGURE 16. The rack assembly 182 may be stacked with other rack assemblies 182 or other rack assemblies 184 or 76 or with the tray assemblies 20 in the previously described manner due to the provision of the raised rim 64 and the open channel 142.

In view of the foregoing, it will be apparent that there has been illustrated and described herein a system for assembling a multiplicity of different trays or racks, with or without internal dividers, by using a minimum number of standard elements. Furthermore, the internal dividers may be appropriately mounted in the racks, where required, to accommodate different sizes or shapes of the articles to be mounted therein.

While there has been illustrated and described the presently preferred embodiments of the present invention, it will be understood that various changes and modifications may be made therein without however departing from the basic inventive concept thereof as set forth in the appended claims.

I claim:

1. An article of the character described comprising an integral walled base member provided with an open gridwork extending between the walls thereof and having portions projecting upwardly from said walls, and an overlying frame member, means defining open recesses at the lower surface of said frame member, said projecting portions being engaged in associated recesses, and means for securing said projecting portions in their associated recesses to retain said members in assembled relation.

2. An article of the character described comprising an integral walled base member provided with an open gridwork extending between the walls thereof and having portions projecting upwardly from said walls, and an overlying frame member, means defining open recesses at the lower surface of said frame member said projecting member portions being engaged in associated recesses, and means for securing said projecting portions in their associated recesses to retain said members in assembled relation, said members being each formed of a plastic material, and said securing means being constituted by staples which extend through said frame member at said recesses thereof so as to extend also through the projecting portions engaged in said recesses.

3. An article of the character described comprising an integral walled base member provided with an open gridwork extending between the walls thereof and having portions projecting upwardly from said walls, and an overlying frame member, means defining open recesses at the lower surface of said frame member, said projecting portions being engaged in associated recesses, and means for securing said projecting portions in their associated recesses to retain said members in assembled relation, said frame member being a rim member having an upwardly extending peripheral rim and said base member having a bottom peripheral channel, whereby a plurality of said articles may be disposed in stacked relation.

4. An article of the character described comprising an integral walled base member provided with an open gridwork extending between the walls thereof and having portions projecting upwardly from said walls, and an overlying frame member, means defining open recesses at the lower surface of said frame member, said projecting portions being engaged in associated recesses, and means for securing said projecting portions in their associated recesses to retain said members in assembled relation, said frame member being a spacer member having portions projecting upwardly from the walls thereof, and a rim member overlying said spacer member and having open recesses defined at the lower surface thereof, said projecting portions of said spacer member being engaged in said open recesses of said rim member, and means for securing said projecting portions of said spacer member in said recesses of said rim member.

5. An article of the character described comprising an integral walled base member provided with an open gridwork extending between the walls thereof and having portions projecting upwardly from said walls, and an overlying frame member, means defining open recesses at the lower surface of said frame member, said projecting portions being engaged in associated recesses, and means for securing said projection portions in their associated recesses to retain said members in assembled relation, said frame member being a spacer member having portions projecting upwardly from the walls thereof, and a rim member overlying said spacer member and having open recesses defined at the lower surface thereof, said projecting portions of said spacer member being engaged in said open recesses of said rim member, and means for securing said projecting portions of said spacer member in said recesses of said rim member, and a cellular assembly mounted within said article above said gridwork.

6. A tray assembly comprising a rectangular walled base member having an open gridwork extending between said walls and integral therewith, upwardly projecting fingers provided at each corner of said base member and between the corners thereof, and a walled rectangular rim member overlying said base member, said rim member having open recesses defined at the lower surface thereof, said fingers being engaged in said recesses and having shoulders which form abutments against which bottom surface portions of said member are engaged.

7. A rack assembly comprising an integral walled base member having an open gridwork extending between the walls thereof, said walls having fingers projecting upwardly therefrom, a walled rim member overlying said base member, said rim member having open recesses defined at the lower surface thereof, said fingers being engaged in said recesses, and a cellular assembly mounted by said rim member over said gridwork.

8. A rack assembly comprising an integral walled base member having an open gridwork extending between the walls thereof; said walls having fingers projecting upwardly therefrom, a walled rim member overlying said base member, said rim member having open recesses defined at the lower surface thereof, said fingers being engaged in said recesses, and a cellular assembly mounted by said rim member over said gridwork, said rim member having open channel formations at the inner surfaces of the walls thereof and said cellular assembly being mounted by said channel formations.

9. A rack assembly comprising an integral walled base member having an open gridwork extending between the walls thereof, said walls having fingers projecting upwardly therefrom, a walled rim member overlying said base member, said rim member having open recesses defined at the lower surface thereof, said fingers being engaged in said recesses, and a cellular assembly mounted by said rim member over said gridwork, said rim member having open channel formations at the inner surfaces of the walls thereof and said cellular assembly being mounted by said channel formations, said channel formations being eccentric in conformation, and said cellular assembly having irregular retainer portions engageable in said channel formations.

10. A rack assembly as in claim 8, said channel formations each having a relatively narrow wing and a wider wing, and said cellular assembly having retainer portions provided along one side edge thereof with a projection between the ends thereof which is engageable with the bottom of the associated narrow wing when the associated retainer portion is engaged in the associated channel formation, whereby said cellular assembly is retained against upward displacement by said channel formations and retained against downward displacement by said open gridwork.

11. A rack assembly as in claim 8, said channel formations each having a relatively narrow wing and a wider wing, and said cellular assembly having retainer portions provided along one side edge thereof with a projection between the ends thereof which is engageable with the bottom of the associated narrow wing when the associated retainer portion is engaged in the associated channel formation, whereby said cellular assembly is retained against upward displacement by said channel formations and retained against downward displacement by said open gridwork, said cellular assembly comprising a first series of parallel strips having openings defined therein and a second series of parallel strips threaded through said openings.

12. A rack assembly as in claim 8, said channel formations each having a relatively narrow wing and a wider wing, and said cellular assembly having retainer portions provided along one side edge thereof with a projection between the ends thereof which is engageable with the bottom of the associated narrow wing when the associated retainer portion is engaged in the associated channel formation, whereby said cellular assembly is retained against upward displacement by said channel formations and retained against downward displacement by said open gridwork, said cellular assembly comprising a first series of parallel strips having openings defined therein and a second series of parallel strips threaded through said openings, said first series of strips having notches provided with inner side openings, said second series of strip notches provided with outer openings, and said first series notches being engaged with said second series notches.

13. A rack assembly comprising an integral walled base member having an open gridwork extending between the walls thereof, said walls having fingers projecting upwardly therefrom, a walled rim member overlying said base member, said rim member having open recesses defined at the lower surface thereof, said fingers being engaged in said recesses, and a cellular assembly mounted by said rim member over said gridwork, a walled spacer member overlying said base member, and a walled rim member overlying said spacer member, said spacer member having open recesses defined at the lower surface thereof and having fingers projecting upwardly from the upper surface thereof, said fingers of said base member being engaged in the recesses of said spacer member, and said rim member having open recesses defined at the lower surface thereof, said fingers of said spacer member being engaged in the recesses of said rim member, and an open cellular assembly mounted between said rim member and said spacer member.

14. A rack assembly as in claim 13, said spacer member and said rim member each having open channel formations at the inner surfaces of the walls thereof, said cellular assembly being mounted by said channel formations.

15. A rack assembly as in claim 13, said spacer member and said rim member each having open channel formations at the inner surfaces of the walls thereof, said cellular assembly being mounted by said channel formations, said channel formations each having a relatively narrow wing and a wider wing, and said cellular assembly having retainer portions provided along one side edge thereof with a projection adjacent one end thereof which is engageable with the bottom of the associated narrow wing of said rim member and an additional projection below said first projection which is engageable with the top of the associated narrow wing of said spacer member when the associated retainer portion is engaged in associated aligned channel formations of said rim member and said spacer member, whereby said cellular assembly is retained against upward displacement by said rim member and against downward displacement by said spacer member.

16. A rack assembly comprising an integral walled base member having an open gridwork extending between the walls thereof, said walls having fingers projecting upwardly therefrom, a walled rim member overlying said base member, said rim member having open recesses defined at the lower surface thereof, said fingers being engaged in said recesses, and a cellular assembly mounted by said rim member over said gridwork, a first walled spacer member overlying said base member, a second walled spacer member overlying said first spacer member, and a walled rim member overlying said second spacer member, each of said spacer members having open recesses defined at the lower surface thereof and having fingers projecting upwardly from the upper surface thereof, said fingers of said base member being engaged in the recesses of said first spacer member, said fingers of said first spacer member being engaged in the recesses of said second spacer member, and said rim member having open recesses defined at the lower surface thereof, said fingers of said second spacer member being engaged in the recesses of said rim member, and an open cellular assembly mounted between said rim member and said first spacer member.

17. A rack assembly as in claim 13, said spacer member and said rim member each having open channel formations at the inner surfaces of the walls thereof, said cellular assembly being mounted by said channel formations, and said cellular assembly having retainer portions, said retainer portions being engaged in the aligned channel formations of said rim member, and said spacer member and extending through substantially the entire vertical extent of said aligned channel formations to said open gridwork.

18. A base member for a tray or rack assembly comprising a rectangular walled member, an open gridwork bounded by the walls of said rectangular member, a pair of fingers projecting upwardly at each of the corners of said walled member, additional fingers projecting upwardly from each wall between the corners thereof, and an open peripheral channel provided at the lower surface of each of said walls.

19. A base member as in claim 18, a corner ledge defined at each corner of said walled member between the fingers at the respective corner, and shoulder means provided on the various fingers at the level of said corner ledges.

20. A rim member for a tray or rack assembly comprising a rectangular walled frame member, a peripheral rim provided on the upper surface of the walls of said member, and pockets provided in said walls, said pockets being open at the lower surface of the walls of said member.

21. A rim member as in claim 20, said pockets being defined on the outer surfaces of said walls.

22. A rim member as in claim 20, said pockets being defined on the outer surfaces of said walls, and channels defined on the inner surfaces of said walls.

23. A rim member as in claim 20, said pockets being defined on the outer surfaces of said walls, and eccentric channels defined on the inner surfaces of said walls.

24. A spacer member for a tray or rack assembly comprising a rectangular walled frame member, a pair of fingers projecting upwardly at each of the corners of said walled member, additional fingers projecting upwardly from each wall between the corners thereof, and pockets provided in said walls, said pockets being open at the lower surface of the walls of said member.

25. A spacer member as in claim 24, a corner ledge defined at each corner of said walled member between the fingers at the respective corner, and shoulder means provided on the various fingers at the level of said corner ledges.

26. A spacer member as in claim 24, a corner ledge defined at each corner of said walled member between the fingers at the respective corner, and shoulder means provided on the various fingers at the level of said corner ledges, and channels defined on the inner surfaces of said walls.

27. A spacer member as in claim 24, a corner ledge defined at each corner of said walled member between the fingers at the respective corner, and shoulder means provided on the various fingers at the level of said corner ledges, and eccentric channels defined on the inner surfaces of said walls.

28. A divider for tray or rack assembly comprising a first series of parallel strips threaded through a second series of parallel strips, each strip of each of said series terminating at each end thereof with a T-shaped end retainer portion.

29. A divider as in claim 28, and notched interlocking means provided on said strip.

30. A divider as in claim 28, said end retainer portions being provided with lateral projections along the marginal edges of a transverse portion thereof.

31. A divider as in claim 28, said end retainer portions being provided with lateral projections along the marginal edges of a transverse portion thereof, there being a pair of projections along one of said edges adjacent one end of said transverse portion and there being a third projection along the other edge of adjacent the other end of said transverse portion.

References Cited by the Examiner

UNITED STATES PATENTS

| | | | |
|---|---|---|---|
| 1,355,486 | 10/1920 | Longenecker | 211—126 |
| 1,823,285 | 9/1931 | Petritsch | 220—22 |
| 2,490,269 | 12/1949 | Johnson | 211—126 |
| 2,557,630 | 6/1951 | Brown | 220—97 X |
| 2,718,326 | 12/1955 | Le Blanc | 220—22 |

FOREIGN PATENTS 402,604  12/1933  Great Britain.

CLAUDE A. LE ROY, *Primary Examiner.*

K. J. WINGERT, *Assistant Examiner.*